Nov. 15, 1949     L. H. ENOS     2,487,860
METHOD OF FABRICATING PROPELLER BLADES
Filed Oct. 8, 1946     3 Sheets-Sheet 1
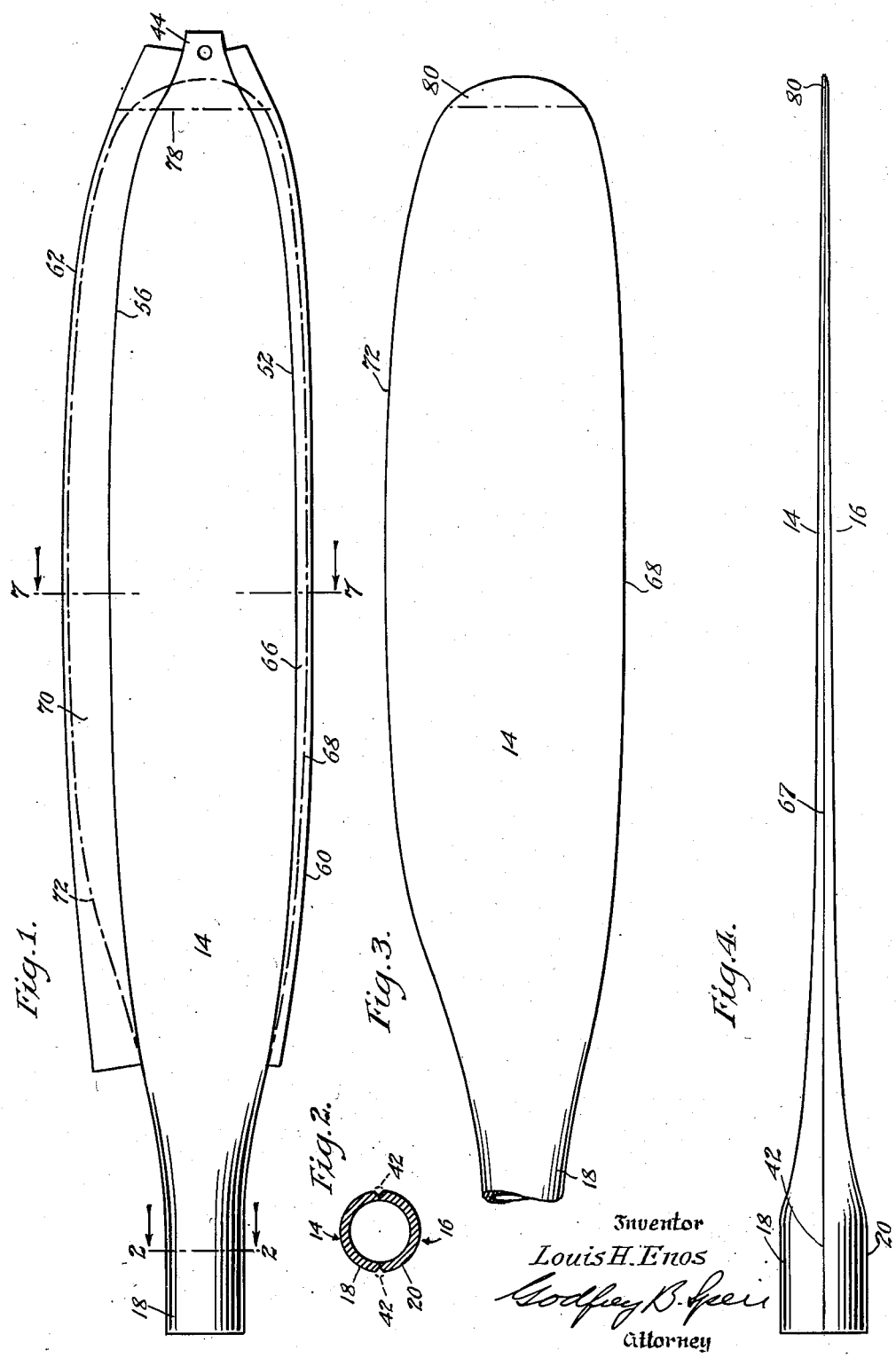
Inventor
Louis H. Enos
Attorney Nov. 15, 1949 L. H. ENOS 2,487,860
METHOD OF FABRICATING PROPELLER BLADES
Filed Oct. 8, 1946 3 Sheets-Sheet 2

Inventor
Louis H. Enos
Godfrey B. Speir
Attorney

Nov. 15, 1949 L. H. ENOS 2,487,860
METHOD OF FABRICATING PROPELLER BLADES
Filed Oct. 8, 1946 3 Sheets-Sheet 3
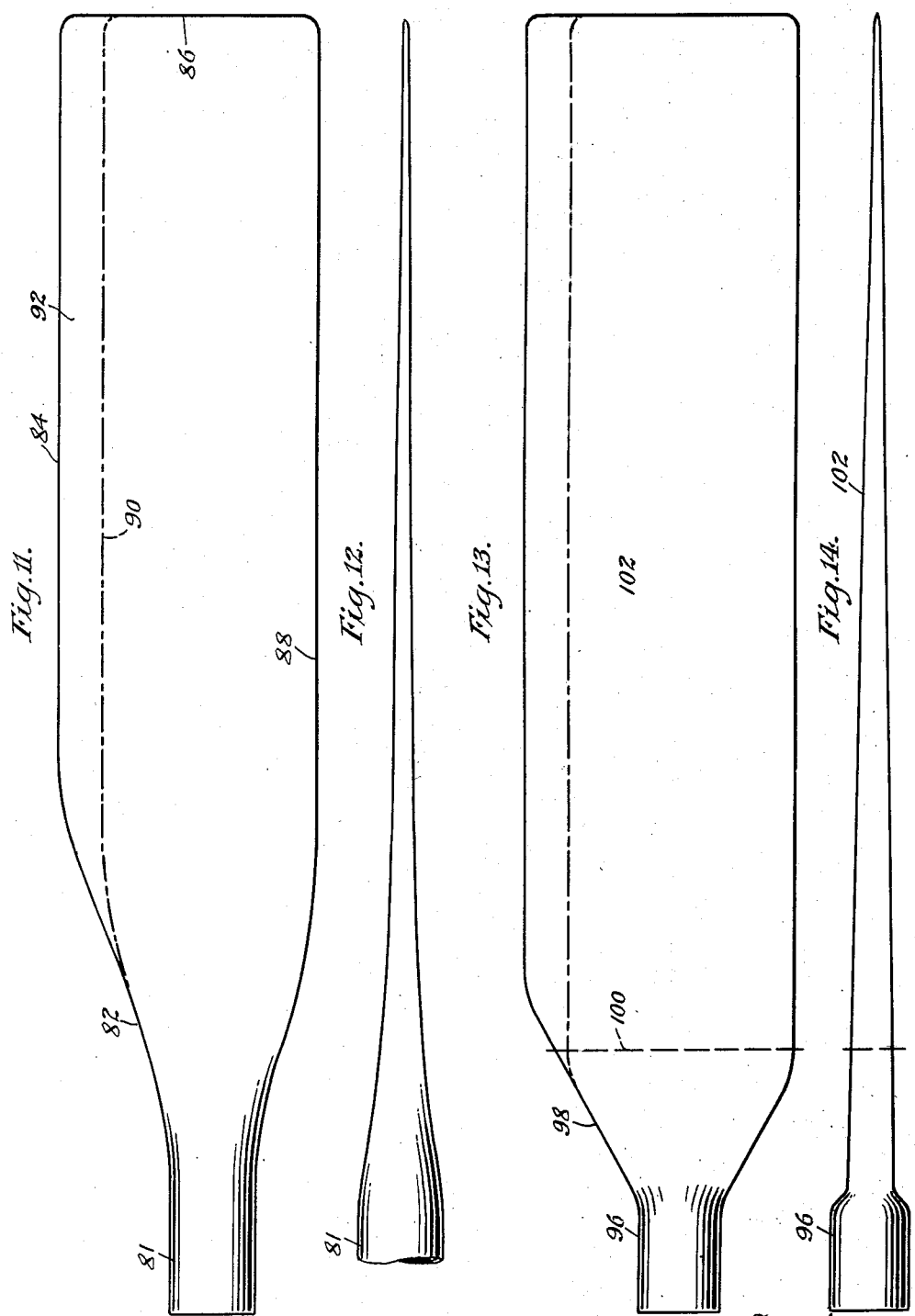

Patented Nov. 15, 1949

2,487,860

UNITED STATES PATENT OFFICE 2,487,860

METHOD OF FABRICATING PROPELLER BLADES

Louis H. Enos, Montclair, N. J., assignor to Curtiss-Wright Corporation, a corporation of Delaware Application October 8, 1946, Serial No. 701,964

7 Claims. (Cl. 29—156.8)

This invention relates to the design and method of fabricating hollow propeller blades for utilization with aircraft.

As the art of hollow propeller blades has progressed, such blades normally being made of high alloy steel, a large variety of fabricating methods and techniques have been developed, few of which have lent themselves to mass production at low unit cost. It has thus become desirable to evolve blade making methods which are practicable for producing large numbers of blades of uniformly high quality, and then to design propeller blades which will fit the methods.

It is an object of this invention to provide a procedure for blade manufacture which lends itself to comparatively simple processes, utilizing however, modern techniques in welding by which a virtually homogeneous body may be produced which includes both virgin steel plates and weld metal. It is a further object of the invention to provide a blade manufacturing method which affords considerable flexibility in the formation of blades of varying diameter and chord, and for either right hand or left hand rotation. Still another object is to provide a blade design which, while utilizing for its fabrication, advanced forms of welding technique, is capable of highly efficient aerodynamic effect and of being produced in automatic welding fixtures having minimum complication. In connection with this latter object, the conventional hollow steel blades having curved leading and trailing edges and having twist imparted to them have been manufactured (a) by hand welding the preformed curved plates and (b) by hand welding or automatically welding partially formed plates and imparting twist to the blades thereafter. Such prior methods, where automatic welding is applied, introduce great complication in that the blade, during the progress of the weld, must be continuously changed in position in order that the weld metal will be deposited in the right places and in homogeneous fashion.

It is a further object of this invention to provide blade forms wherein central blade portions are formed as hollow steel structures and where leading edge and trailing edge portions are added, as solid metal, to permit considerable latitude in the airfoil section of the blade with respect to camber and chord. A further object of the invention is to provide a technique for building hollow blade structures, subject to subsequent formation to final blade form, wherein the distribution of material is adapted at the outset to lend itself to the desired distribution of material in the final article.

The above objects are accomplished by the structure and arrangement set forth in the following description when taken in connection with the accompanying drawings in which Fig. 1 is a planform elevation of one form of propeller blade in process of manufacture;

Fig. 2 is a section on the line 2—2 of Fig. 1;

Fig. 3 is a plan of the final blade of Fig. 1;

Fig. 4 is an edge form elevation of the blade of Fig. 1 prior to twist being imparted thereto;

Fig. 11 is a planform elevation of an alternate propeller blade constructed according to the principles of the invention;

Fig. 12 is an edge form elevation of the blade of Fig. 11;

Fig. 13 is another alternative planform elevation of a blade according to the invention; and Fig. 14 is an edge form elevation of the blade of Fig. 13.

It is to be expressly understood that the drawings are employed for purpose of illustration only and are not designed as a definition of the limits of the invention, reference being had to the appended claims for this purpose.

Figure 5:
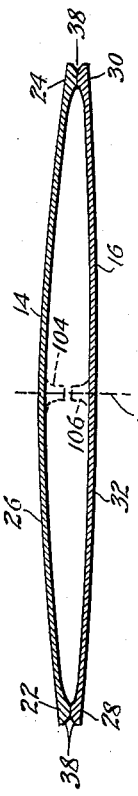
Figs. 5 through 10 are sections on the line 7—7 of Fig. 1 showing the blade profile and successive stages in the fabrication of the blade.

Referring first to Figs. 1 through 10, the blade planform shown therein is of the conventional substantially oval character. The blade comprises a camber plate 14 and a thrust plate 16 both blending at their ends into hemi-cylindrical shank portions 18 and 20. The camber plate 14, is first prepared by forging or machining a plate to provide a shank portion, a longitudinally tapered blade portion, thickened edge portions 22 and 24, and a relatively thin portion 26 between said edges. The plate, after forging or machining, is die pressed to provide its airfoil portion with a convex camber as shown, and its shank portion with hemi-cylindrical form, as shown in Fig. 2, the thickness of the shank portion preferably being uniform throughout. In similar fashion, the thrust plate 16 is forged or machined from a plate and is then formed to provide a convex airfoil portion as shown in Fig. 5 and a hemi-spherical shank portion as shown in Fig. 2. The camber plate 14 and the thrust plate 16 are different to the extent that the camber plate has greater convexity than the thrust plate, although the chordal dimension from the extremes of the edges 22 and 24 of the camber plate 14 will be the same as the chordal dimension from the extremes of the thickened edges 28 and 30 of the thrust plate 16, said latter plate, in its thin portion 32, being flatter than the portion 26 of the camber plate. Also, there may be differences in thickness of the plates in accordance with design requirements.

The two plates 14 and 16 will be formed to have planar edges throughout their length substantially in the chordal plane. The two plates are then juxtaposed as shown in Fig. 5 so that their plane edges lie adjacent one another, the two plates being held in this relationship by suitable vises. Within the hollow defined between the thin plate portions 26 and 32, removable mandrels are disposed to hold the plates in the proper spaced relationship.

Figure 6:
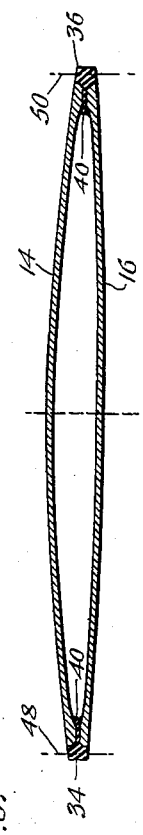

Thereupon, the assembled plates are welded along their edges as shown in Fig. 6, said welding being accomplished by disposing the plates in a vertical plane so that first the edges 22, 28 are uppermost whereupon a weld bead 34 is laid into and across the edges of the plates, including the shanks. Said weld bead is built up to any desired extent. Thereafter, the plate is turned over so that the edges 24, 30 are uppermost and a weld bead 36 is laid in along the edges of the plates. Prior to welding, the several edges will have been chamfered as at 38 to form a V notch at the plate edges to receive the weld metal.

The preferred welding method for joining the plates is called automatic, submerged arc welding, which method builds up a solid bead of material having substantially identical characteristics with those of the virgin plate, the welding process being so controlled that oxidation or decarburization of the weld metal and of the plate material adjacent the weld is minimized. Furthermore, the welding technique contemplates the penetration of the weld between the adjacent flat faces of the matching plates and into the hollow formed between the two plates, the molten weld metal being so confined by appropriate mandrels within the blade hollow that it will form a fillet as at 40 in Fig. 6. The welding extends along the blade edges and is also carried on into the shank, where the two hemi-spherical portions 18 and 20 of the blade plates are integrally united at the points 42 in Fig. 2. The initial blade plates, toward their tips, are formed as shown at 44 in Fig. 1, so that the weld is linear in character from root to tip of the blade, the formation of the blade tip being left to a subsequent series of operations.

Figure 7:
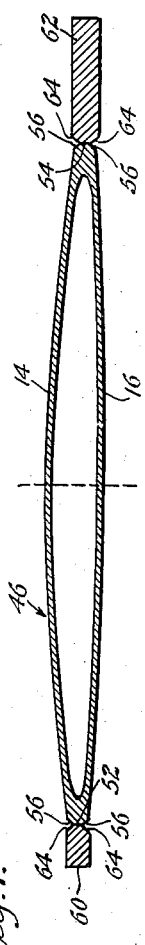
Figure 8:
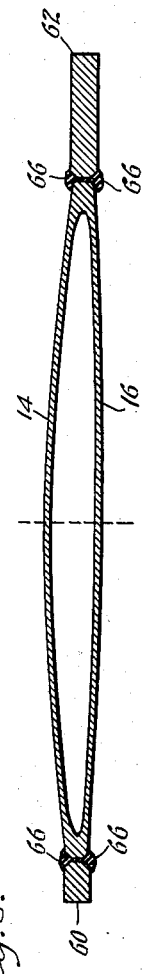
Figure 9:
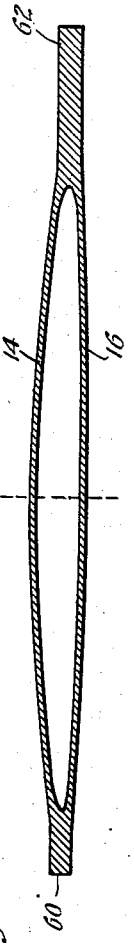

After the above described procedure, excess weld metal is removed, leaving the rudimentary blade in integral form as shown at 46 in Fig. 7. The weld metal is trimmed off to the lines 48 and 50 on respective blade edges as shown in Fig. 6, and the rudimentary blade edges, indicated at 52 and 54 in Fig. 7, are chamfered on both corners as at 56. A leading edge strip 60, of the same sort of material as the blade plates, is formed as indicated in Figs. 1 and 7, to lie adjacent the edge 52 of the rudimentary blade, and a trail edge strip 62 is formed as indicated in Figs. 1 and 7 to lie adjacent the edge 54 of the rudimentary blade. The strips 60 and 62 are chamfered as at 64 to define, with the several chamfers 56 of the rudimentary blade, the notches between the strips and rudimentary blade. Thereupon, weld metal, indicated at 66 in Fig. 8, is deposited in said V notches to join the strips 60 and 62 integrally to the rudimentary blade, the weld extending through the plates and edges. This welding is accomplished in a succession of passes in an automatic submerged arc welding machine preferably the four weld inlays being accomplished either singly or in pairs with the rudimentary blade positioned in a horizontal plane with the V notches being welded, uppermost. These steps produce an integral blade construction exemplified by the solid outline of Fig. 1 whereafter the weld flash of the weld 66 is trimmed off to form a blade construction of integral character as exemplified by Fig. 9.

Figure 10:
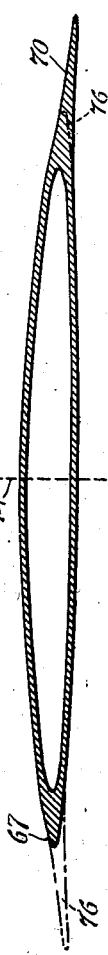

The lead edge strip 60 is then trimmed and dressed to provide a blade leading edge whose profile is indicated at 67 in Fig. 10 and whose planform is indicated by the dot-dash line 68 of Fig. 1. In a similar manner, the trail edge strip 62 is dressed to the profile indicated at 70 in Fig. 10 and to the planform shown in dot-dash lines at 72 in Fig. 1.

The blade plates 14 and 16 before adding the strips 60 and 62 are substantially symmetrical about a longitudinal plane normal to the blade chord, indicated by the line 74 in Figs. 5 through 10. The lead edge strip 60 and the trail edge strip 62 may be welded to either edge of the plate construction so that either right or left hand propeller blades may be produced, still using the plate 14 as the camber plate and the plate 16 as the thrust plate of the ultimate propeller blade. Where the solid line outline in Fig. 10 indicates a left-hand blade, an alternate right-hand blade profile is indicated in the dot-dash lines of Fig. 10 at 76. Upsetting of the blade shank, to provide thickened shank material, is an additional step accomplished either before or after application of the strips 60 and 62 of the rudimentary blade.

The remaining processing to be accomplished on the blade is to embrace it in forming dies while hot, and applying gas under high pressure within the blade hollow so that the blade profile is conformed to the dies and so that the blade is twisted to impart that twist which is necessary to secure proper aerodynamic effect. The profile of the plates 14 and 16 in Fig. 10 may be distorted from the symmetrical original form (about the plane 74) to produce asymmetry of the hollow blade portion with respect to the plane 74 when the blade is formed in blow-up dies. The planform of the hollow blade portion however, remains substantially the same when the blade is subjected to the blow-up process. In the blow-up process which is well known in the art, the appropriate twist is imparted not only in the hollow portions of the blade, involving the plates 14 and 16, but also in the leading edge and trailing edge strips 66 and 70.

In a blade of the type just described, it will be clear that, due to its planform, some form of blade positioning equipment will be necessary during the welding steps of the process in order that that portion of a blade edge being welded will lie substantially horizontal to enable proper application of the arc welding method.

During the processing prior to application of the blow-up die technique, the tip end of the rudimentary blade is preferably cut off along a line such as 78 in Fig. 1, and a separately formed tip portion of metal or other material is welded or is otherwise secured to the blade structure to give the tip configuration indicated at 80 in Fig. 3. Alternatively, the original material may be trimmed and shaped to form the blade tip.

Reference may now be made to Fig. 11 which shows a blade whose airfoil portion outboard of a cylindrical shank 81 blends at a zone 82 into a blade of rectilinear planform as at 84, with a substantially square tip 86. The blade of this planform may be readily fabricated by using the techniques previously outlined, with particular reference to Figs. 5 through 10. The original blade plates would have the form limited by the lines 88 and 90, the camber and thrust plates for the blade having the same width and symmetry about a longitudinal plane normal to the blade chord plane but having differential convexity. After the welding process as described in connection with Fig. 6, the edges of the blade of Fig. 11 would be appropriately dressed and a straight trailing edge strip 92 and a leading edge strip if needed, would be applied in the same fashion as the strips 60 and 62 were applied in connection with Fig. 8. The strip 92 is subsequently trimmed and dressed to appropriate profile and planform, and the blade is then formed in blow-up dies, as is known in the art. It will be clear that the blade of rectilinear form requires, virtually, only straight welding passes so that tilting of the blade during welding becomes negligible except in the zone 82.

In Fig. 13, I show a blade planform and edge form which lends itself even more ideally to the process steps previously outlined, wherein the airfoil portion of the blade is of wholly rectilinear planform, enabling the welding of the two preshaped plates and the welding of the trail edge strip thereto in straight welding passes. The shank 96 and transition zone 98 from shank to airfoil section, are preferably formed as a separate single part which is flash or otherwise welded or secured along the line 100 to the airfoil blade portion 102 which has been previously fabricated. Either before or after the joining of the airfoil section 102 to the prefabricated shank portion 96, 98 appropriate airfoil form and twist may be imparted to the airfoil section 102 by blowup dies or the like.

While in general, the blade plates such as 14 and 16 are shown without any central reinforcement or ribs, it may be desirable to form ribs such as 104 and 106, indicated in dotted lines in Fig. 5, on the camber and thrust plates 14 and 16 respectively. The use of ribs of this sort is appropriate for large propeller blades, and their formation in the blade plates is a procedure which is well known in the propeller blade art.

The single degree of blade plate symmetry about the plane 74 as mentioned heretofore, avoids the need for right hand and left hand tooling and plates if the same type of blade is to be used for right or left hand propellers. Rudimentary blades built according to the methods outlined herein will accommodate themselves perfectly to final forming dies without excessive buckling, stretching or crowding of the plate material. If symmetry were to be maintained only about the chordal plane, or about the chordal plane and the central plane normal thereto (74), the final blow-up dies would crowd the thrust plate or stretch the camber plate or both, since the final blade profile is not symmetrical about the chordal plane. This is due to the finally desired relatively great convexity of the camber plate and lesser convexity of the thrust plate.

Though several embodiments illustrating the invention have been shown and described, it is to be understood that the invention may be applied in various forms. Changes may be made in the arrangements, without departing from the spirit of the invention. Reference should be had to the appended claims for definitions of the limits of the invention.

What is claimed is:

1. The method of fabricating a propeller blade which consists in forming a camber plate of blade planform with thickened planar edges, forming a thrust plate of blade planform with thickened planar edges, the camber plate having greater width than the thrust plate, forming said plates to convex configuration so that the chordal dimensions of both plates are the same with the camber plate more convex than the thrust plate, said plates being formed symmetrically on both sides of a central longitudinal plane normal to the plate plane, superimposing said plates on one another with their planar edges in registry, edge welding said plates to form a rudimentary propeller blade, adding material by welding to one edge of the rudimentary blade to form an extended leading edge, adding material by welding to the other edge in sufficient amount to form an extended trailing edge, dressing the added material to leading and trailing edge external form, heating the rudimentary blade, embracing the rudimentary blade in forming dies having twist and airfoil forming characteristics, and imposing pressure within the blade to conform it to the die cavity and to distort said symmetry for producing a substantially finished propeller blade.

2. The method of fabricating a propeller blade which consists in forming two convex plates as thrust and camber members each being symmetrical on either side of a central plane normal to the plate edge plane, and having different curvature, matching the edges of said plates in coplanar contacting relation and welding them together, welding a trailing edge strip along one edge of said plates to form a rudimentary propeller blade of one hand, said strip when welded along the other edge of said plates being adapted to form a rudimentary propeller blade of the other hand, and forming the rudimentary blade with airfoil pitch and twist into a propeller blade of appropriate hand.

3. The method of fabricating a propeller blade which consists in forming two convex plates as thrust and camber members each being symmetrical on either side of a central plane normal to the plate edge plane, and having different curvature, matching the edges of said plates in coplanar contacting relation and welding them together, welding a trailing edge strip along one edge of said plates to form a rudimentary propeller blade of one hand, said strip when welded along the other edge of said plates being adapted to form a rudimentary propeller blade of the other hand, adding metal by welding to the opposite edge of said welded plates from said trailing edge strip to build up an extended blade leading edge, and forming the rudimentary blade with airfoil pitch and twist into a propeller blade of appropriate hand.

4. The method of fabricating a propeller blade which consists in forming two plates as thrust and camber members with planar edges, having similar width at similar stations along the blade, both said plates being formed symmetrically relative to an axial plane normal to the plane of the edges, said plate formation including thinning said plates inwardly of the edges to leave planar and thickened edges, chamfering said edges, disposing said plates adjacent one another with their edges substantially coplanar and in registry, so that said chamfers coact to form a V groove around the periphery of the assembled members, welding said plates together by inlaying weld metal in said grooves concurrently with the application of sufficient welding heat to fuse said thickened edges together and to form a fillet between and within said plates, and adding to the edges of said blade, by welding, metal strips to provide leading and trailing edges.

5. The method of fabricating a propeller blade which consists in forming two plates as thrust and camber members with planar edges, having similar width at similar stations along the blade, both said plates being formed symmetrically relative to an axial plane normal to the plane of the edges, said plate formation including thinning said plates inwardly of the edges to leave planar and thickened edges, chamfering said edges, disposing said plates adjacent one another with their edges substantially coplanar and in registry, so that said chamfers coact to form a V groove around the periphery of the assembled members, welding said plates together by inlaying weld metal in said grooves concurrently with the application of sufficient welding heat to fuze said thickened edges together and to form a fillet between and within said plates, adding to the edges of said blade, by welding, metal strips to provide leading and trailing edges, dressing said strips to leading edge and trailing edge form, and finally forming said blade to airfoil configuration.

6. The method of fabricating a propeller blade which consists in forming a camber plate of blade planform with thickened planar edges, forming a thrust plate of blade planform with thickened planar edges, the camber plate having greater width than the thrust plate, forming said plates to convex configuration so that the chordal dimensions of both plates are the same with the camber plate more convex than the thrust plate said formed plates being symmetrical on both sides of a central longitudinal plane normal to the plane of said edges, superimposing said plates on one another with their planar edges in registry, edge welding said plates to form a rudimentary propeller blade, heating the rudimentary blade, embracing the rudimentary blade in forming dies having twist and airfoil forming characteristics, and imposing pressure within the blade to conform it to the die cavity and to distort said symmetry for producing a substantially finished propeller blade.

7. The method of fabricating a propeller blade which consists in forming a camber plate of blade planform with thickened planar edges, forming a thrust plate of blade planform with thickened planar edges, the camber plate having greater width than the thrust plate, forming said plates to convex configuration so that the chordal dimensions of both plates are the same with the camber plate more convex than the thrust plate said formed plates being symmetrical on both sides of a central longitudinal plane normal to the plane of said edges, superimposing said plates on one another with their planar edges in registry, edge welding said plates to form a rudimentary propeller blade, adding material by welding to one edge of the rudimentary blade to form an extended leading edge, adding material by welding to the other edge in sufficient amount to form an extended trailing edge, heating the rudimentary blade, embracing the rudimentary blade in forming dies having twist and airfoil forming characteristics, and imposing pressure within the blade to conform it to the die cavity and to distort said symmetry for producing a substantially finished propeller blade.

LOUIS H. ENOS.

REFERENCES CITED

The following references are of record in the file of this patent:

UNITED STATES PATENTS

| Number | Name | Date |
|---|---|---|
| 1,622,835 | Marshall | Mar. 29, 1927 |
| 1,818,492 | McFarland | Aug. 11, 1931 |
| 1,835,913 | Squires | Dec. 8, 1931 |
| 1,839,811 | Squires | Jan. 5, 1932 |
| 2,007,775 | Smith | July 9, 1935 |
| 2,170,865 | Lampton | Aug. 29, 1939 |
| 2,231,888 | Couch | Feb. 18, 1941 |
| 2,235,032 | McKee | Mar. 18, 1941 |
| 2,266,050 | Lampton | Dec. 16, 1941 |
| 2,293,801 | Caldwell | Aug. 25, 1942 |
| 2,394,445 | Handler | Feb. 5, 1946 |
| 2,394,446 | Handler | Feb. 5, 1946 |
| 2,427,785 | Hoover | Sept. 23, 1947 |
| 2,450,440 | Mills | Oct. 5, 1948 |